(12) United States Patent
Nishimoto et al.

(10) Patent No.: US 7,725,616 B2
(45) Date of Patent: *May 25, 2010

(54) DATA PROCESSING SYSTEM AND DATA PROCESSOR

(75) Inventors: Junichi Nishimoto, Kawasaki (JP); Takuichiro Nakazawa, Higashimurayama (JP); Koji Yamada, Machida (JP); Toshihiro Hattori, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 12/155,412

(22) Filed: Jun. 4, 2008

(65) Prior Publication Data

US 2008/0250187 A1    Oct. 9, 2008

Related U.S. Application Data

(63) Continuation of application No. 11/203,210, filed on Aug. 15, 2005, now Pat. No. 7,401,165, which is a continuation of application No. 10/470,758, filed as application No. PCT/JP01/09322 on Oct. 24, 2001, now Pat. No. 7,401,163.

(30) Foreign Application Priority Data

Jan. 31, 2001  (JP) .............................. 2001-022587

(51) Int. Cl.
    *G06F 13/38* (2006.01)
(52) U.S. Cl. ............................. 710/14; 710/38; 713/324
(58) Field of Classification Search ........................ None
    See application file for complete search history.

(56) References Cited

U.S. PATENT DOCUMENTS

| 5,481,186 | A  | 1/1996  | Heutmaker et al. |
| 5,504,908 | A  | 4/1996  | Ikeda |
| 5,640,427 | A  | 6/1997  | Rainish |
| 5,768,289 | A  | 6/1998  | James |
| 5,805,882 | A  | 9/1998  | Cooper et al. |
| 6,163,828 | A  | 12/2000 | Landi et al. .................. 710/240 |
| 6,260,166 | B1 | 7/2001  | Bhavsar et al. |
| 6,370,546 | B1 | 4/2002  | Kondo .......................... 707/201 |
| 6,501,999 | B1 | 12/2002 | Cai .............................. 700/82 |
| 6,684,324 | B2 | 1/2004  | Floman et al. .................. 713/1 |
| 6,715,090 | B1 | 3/2004  | Totsuka et al. |
| 6,728,822 | B1 | 4/2004  | Sugawara et al. |
| 6,738,845 | B1 | 5/2004  | Hadwiger et al. ........... 710/240 |
| 6,907,264 | B1 | 6/2005  | Sterkel |

(Continued)

FOREIGN PATENT DOCUMENTS

EP    0992900 A2    4/2000

(Continued)

*Primary Examiner*—Ilwoo Park
(74) *Attorney, Agent, or Firm*—Mattingly & Malur, P.C.

(57) ABSTRACT

One data processor is provided with an interface for realizing connection with the other data processor. This interface is provided with a function for connecting the other data processor as a bus master to an internal bus of the one data processor, and the relevant other data processor is capable of directly operating peripheral functions that are memory mapped to the internal bus from an external side via the interface. Accordingly, the data processor can utilize the peripheral functions of the other data processor without interruption of the program being executed. In short, one data processor can use in common the peripheral resources of the other data processor.

17 Claims, 10 Drawing Sheets

U.S. PATENT DOCUMENTS

| | | |
|---|---|---|
| 6,925,510 B2 | 8/2005 | Yu |
| 2002/0124125 A1 | 9/2002 | Bormann et al. |
| 2005/0273526 A1 | 12/2005 | Nishimoto et al. |

FOREIGN PATENT DOCUMENTS

| | | |
|---|---|---|
| JP | 63128837 | 6/1988 |
| JP | 63148364 | 6/1988 |
| JP | 363868 | 3/1991 |
| JP | 04276838 | 10/1992 |
| JP | 5151075 | 6/1993 |
| JP | 05346864 | 12/1993 |
| JP | 6139063 | 5/1994 |
| JP | 736704 | 2/1995 |
| JP | 837546 | 2/1996 |
| JP | 8274821 | 10/1996 |
| JP | 9190353 | 7/1997 |
| JP | 11134484 | 5/1999 |
| JP | 200010702 | 1/2000 |
| JP | 2000163312 | 6/2000 |
| JP | 2000164796 | 6/2000 |
| JP | 2000298585 | 10/2000 |

DATA PROCESSING SYSTEM AND DATA PROCESSOR

The present application is a continuation of application Ser. No. 11/203,210, filed Aug. 15, 2005; which is a continuation of application Ser. No. 10/470,758, filed Jul. 31, 2003, the contents of which are incorporated herein by reference.

This application is a 371 of PCT/JP01/09322 filed Oct. 24, 2001, which published as PCT Publication No. WO02/061591 on Aug. 8, 2002.

BACKGROUND OF THE INVENTION

The present invention relates to a data transfer system for bus connecting data processors and to a data transfer system for use in a system formed of a plurality of data processors and a plurality of system buses. For example, the present invention relates to a technique in which a data processor uses, in common, the built-in circuits of other data processors, and to a technique in which a data processor makes access to the external buses of other data processors. Moreover, the present invention relates to a technique for boot control in which an operation program of a data processor is initially stored in memory.

With the development of more complicated systems, the number of data processors and components mounted in a system is increasing. For example, in a mobile phone system, a baseband data processor for controlling communication has been used to control software (application and key control or the like) and hardware (components of RF circuit, LCD and memory or the like). However, with diversification of functions, it is now difficult for the baseband processor to perform all processes. In a known PC system, this problem has been solved by improving the operating frequency of the data processor, but in a battery-driven type mobile terminal it is not possible to simply improve the performance with use of a higher frequency, because, for such purpose, the operating life of the battery must be expanded.

It has also been proposed to use a method to vary the frequency with the processes that are being executed by the data processor, but realization of such a technique in practical use is difficult, because actual realization is very difficult in the system. Moreover, a data processor which can realize high speed operation tends to become large in the chip area, and it is also difficult to reduce the current value during the standby state.

In order to solve this problem, applications which cannot be processed with available data processors of the prior art have been processed using a co-processor or another data processor. Accordingly, since it is possible to operate only data processors that are suitable for particular processes, when such particular processes are required, the system can be formed easily, and, finally, a reduced power consumption of the system as a whole can also be realized.

When a plurality of data processors, such as a data processor and a co-processor or the like, are mounted in one system, a common bus is frequently used for connection of the data processors. However, when a data processor which cannot use a common bus is used, and when full performance cannot be exhibited through common use of a bus because the memory access performance is insufficient, it is required to conduct the data transfer by providing a certain interface to one data processor and then connecting this interface to the bus of the other processor. As this interface, there is a host port interface supported, for example, by the DSP (TMS320C54x) of TI. In actual practice, data transfer is performed between data processors by utilizing the RAM built in the data processor and the interruption function of the processor. However, software must be executed to use the data transferred.

Not only the system, but also the function itself of the data processor, are highly sophisticated. When a plurality of data processors are mounted to the system, it is not required for a plurality of data processors to support the same duplicated function, by efficiently using the functions mounted to the data processors, such as memory interface, USB (universal serial bus), memory card, serial interface for SDRAM (Synchronous DRAM) or the like. When data processors are connected with an interface not depending on the common bus, the data transferred must be processed with software under the condition that the functions supported by the respective data processors are used. For example, when a certain data processor desires to make access to a memory by utilizing a memory interface of another data processor, it has been required that the data to be accessed with the above-mentioned interface is first transferred to another data processor, a program of the other data processor is thereafter executed as an interruption process, thereby the other data processor in the execution of such a program makes access to a memory, and the other data processor issues, after such access, an interruption to the one data processor for effecting the data transfer to the one data processor via the interface.

As another problem resulting from the complicated system structure, reduction of the mounting area may be listed. Particularly, at a mobile information terminal, it is required to reduce the number of components used in the system in order to reduce the mounting area, from the viewpoint of reduction in power consumption and cost. However, when the system is improved so as to have multiple functions, the number of components also increases so as to realize such functions. Particularly, when a plurality of data processors are comprised as described above, this problem becomes more serious.

In the case where a plurality of data processors are mounted on the system, as described in regard to the technology of the prior art, and such data processors cannot be connected with a common bus, it is required to provide an interface for mutually connecting the data processors. The host interface, such as a DSP of TI, performs handshake operations to realize data transfer by utilizing the RAM built in the data processor and the interruption function of the processor. In using this method, since it is required to execute the interruption process program for every data transfer, the performance may be deteriorated because the execution of the program currently being operated is interrupted. Particularly, a problem arises when it is required to use only an external interface supported by the data processor.

Moreover, the inventors of the present invention have considered the technology used to initially store an operation program of a data processor to a memory. For example, in a microprocessor where an electrically reprogrammable flash memory is formed on a chip to store the operation program of the CPU, an initial program for such flash memory is generally written, for example, using, in its fabrication stage, a writing device, such as an EPROM writer. However, such a write operation is complicated, and, moreover, it takes a longer time because such a write operation is accompanied by a verify process and a rewrite process. Therefore, this write operation is also considered as a cause of a rise in the fabrication cost of a data processor.

SUMMARY OF THE INVENTION

It is therefore an object of the present invention to realize a data processor which has a data transfer interface for data transfer, in addition to a memory interface, in a data processing system which is complicated due to its ability to perform multiple functions.

Moreover, the present invention has another object to effectively use the internal function of a relevant data processor, or external circuits of the relevant data processor, from another data processor or device connected to such interface. Moreover, the present invention is intended to finally realize low power consumption through improvement of system performance and realization of low cost.

A further object of the present invention is to provide a data processing system and, moreover, a data processor which can easily realize a process to initially write a program to be executed by the data processor to a nonvolatile memory.

The above-mentioned and other objects and novel features of the present invention will become more apparent from the description provided in the present specification and from the accompanying drawings.

The typical aspects of the invention disclosed in this specification will be briefly described below.

[1] According to a first aspect of the present invention, an internal bus access of a data processor is allowed to other data processors.

According to this first aspect of the present invention, a data processor (100) is provided with an interface (119) to enable connection with another data processor (101) and this interface is provided with a function to connect the other data processor as a bus master to the internal bus of one data processor to support the function to directly operate a peripheral function that is memory-mapped to the internal bus with the relevant other data processors from an external side via the interface. Thereby, the data processor is capable of utilizing the peripheral functions of the other data processor without interruption of the programs being executed therein. When the first data processor makes access, for example, to a particular memory using the memory interface of a second data processor, the first data processor is capable of making access and then using the peripheral memory and the other peripheral circuits via the interface of the second data processor. In short, one data processor can use in common the peripheral resources of the other data processors. In other words, the first data processor can directly use the other interface function provided in the second data processor. Thereby, high performance of the system can be realized.

The invention according to above-described aspect will be described in further detail. The data processing system according to the first aspect includes the first data processor (100) and the second data processor (101). The second data processor comprises the interface (119) which allows the first data processor to obtain the right to use the internal bus of the second data processor. The interface causes the first data processor having obtained the right to use the internal bus, to make access to an input/output circuit that is connected to the internal bus.

The input/output circuit is formed of a single circuit or of a plurality of circuits selected, for example, from a SDRAM interface circuit that is connected to a SDRAM, an LCD interface circuit that is connected to a liquid crystal display device, a memory card interface circuit that is connected to a memory card, a serial interface circuit, a nonvolatile memory, an electrically reprogrammable nonvolatile memory and a general purpose input/output port circuit.

The interface may include a buffer RAM (107) which exclusively responds to carry out access from the second data processor and access from the first data processor.

[2] According to a second aspect of the present invention, the other data processor is allowed to make access to the inherent external bus of the one data processor via the relevant one data processor.

The present invention according to this second aspect is provided with a device (114) which enables an interface, within the second data processor, to effect connection between the first data processor (100) and the external device (104) of the relevant second data processor, while the second processor (101) is in the waiting condition (power supply is off or in a standby state). Accordingly, the first data processor is capable of controlling the device connected to the second data processor without use of an external circuit during the waiting condition of the relevant second data processor. In short, even when the second data processor is in the waiting condition, the first data processor is capable of controlling the external circuit connected to the relevant second data processor by bypassing the internal circuits of the second data processor. Thereby, the number of components forming the data processing system can be reduced, and reduction in cost can also be realized.

The invention based on the above-described aspect will be described in further detail. The data processing system according to the second aspect includes the first data processor (100), a first bus (103) connected to the first data processor, the second data processor (101) connected to the first bus, and a second bus (105) connected to the second data processor. The second data processor includes a first external interface circuit (119) which is connected to the first bus at one terminal and to the internal bus at the other terminal, a second external interface (113) which is connected to the second bus at one terminal and to the internal bus at the other terminal, and a switch circuit (114) for connecting the one terminal of the first interface circuit to the second bus in place of the one terminal of the second external interface circuit, while the second data processor is in the waiting condition.

In the waiting condition of the second data processor, the supply of a clock signal, for example, to a clock synchronization circuit included in the second data processor is suspended. Moreover, a power supply control circuit (116b) is also included in the second data processor to separate the operation power supply of the switch circuit from the operation power supply of the other circuits and to suspend the supply of the operation power supply to a part or the entire part of the above-described and the other circuits in response to the waiting condition of the second data processor. Thereby, the power consumption may be reduced in the waiting condition of the second data processor.

The second external interface circuit includes an LCD interface circuit which can be connected, for example, to a liquid crystal display controller. In this case, the second bus is connected with the liquid crystal display controller. Accordingly, the first data processor is capable of controlling the liquid crystal display controller via the switch circuit.

[3] According to a third aspect, operation control for initially writing an operation program, to be executed with a data processor, after a reset operation is cancelled, to an on-chip nonvolatile memory and nonvolatile memory on the local bus may be realized via the relevant data processor.

The data processing system of the present invention, according to this third aspect, includes the first data processor (100) and the second data processor (101). The second data processor includes a nonvolatile memory (107) which is controlled to write the data with the first data processor in a first operation mode after the reset operation is cancelled, a CPU (109) which considers the nonvolatile memory as an object of instruction fetch after the write operation in the first operation mode, and an electrically reprogrammable nonvolatile memory (502) which is considered as the object of instruction fetch by the CPU in the second operation mode after the reset operation is cancelled. The first data processor designates the first operation mode to the second data processor, and then it stores, to the nonvolatile memory, a write control program for the nonvolatile memory and allows the CPU to fetch an instruction. Accordingly, the second data processor is capable of executing the write control program that is written to the nonvolatile memory and then of initially writing the operation program of the first data processor to the on-chip nonvolatile memory depending on such execution. It is sufficient for execution of this operation program that the second operation mode is designated after the reset operation is cancelled.

The electrically reprogrammable nonvolatile memory is never limited to the on-chip memory of the first data processor. This memory may be an electrically reprogrammable nonvolatile memory (501) connected to the local bus of the first data processor.

According to the third aspect, operation control to initially write the operation program, to be executed by the data processor, after the reset operation is cancelled, to the on-chip nonvolatile memory and the nonvolatile memory on the local bus can be realized via the relevant data processor. In short, it is no longer required to execute the process to write the program to the on-chip program memory or the like in the fabrication process of the data processor.

[4] A fourth aspect of the present invention is directed to the data processor to be applied to the data processing system based on the first to third aspects described above.

A data processor includes a CPU (109), an internal bus connected to the CPU, a peripheral circuit (116) connected to the internal bus, the first external interface circuit (119) connected to a first external terminal at one terminal thereof and to the internal bus at the other terminal, and the second external interface circuit (113) connected to a second external terminal at one terminal thereof and to the internal bus at the other terminal thereof. The first external interface circuit obtains the right to use the internal bus in response to an external access request and enables access to the peripheral circuit that is connected to the internal bus. Accordingly, a data processor is capable of allowing the other data processors to use the on-chip peripheral circuits connected to the internal bus.

Moreover, the switch circuit (114) for connecting the first external terminal to the second external terminal in place of the second external interface circuit during the waiting condition of the CPU may also be included. The other data processors are allowed, via the relevant one data processor, to make access to the inherent external bus of the one data processor. For example, when an LCD controller is connected to the local bus of a data processor, the other data processor can realize a time display control function for the LCD via the LCD control on the local bus via the system bus when the relevant data processor is in the waiting condition.

According to the third aspect of the present invention, whereby a boot program of data processor is initially written, a data processor further includes a nonvolatile memory which is externally written via the first external interface circuit in the first operation mode after the reset operation is cancelled, and a program memory such as an electrically reprogrammable nonvolatile memory. The CPU can fetch an instruction from the nonvolatile memory after the write operation in the first operation mode and then execute such instruction; and, moreover, the CPU can fetch the instruction from the program memory in the second operation mode after the reset operation is cancelled and then execute this instruction. The boot program of the data processor can be initially written to the nonvolatile program memory by writing a write control program for the program memory to the nonvolatile memory in the second operation mode and then executing the written write control program in the second operation mode.

A data processor can be configured with a single chip by forming, on one semiconductor substrate, the CPU, internal bus, first external interface circuit, second external interface circuit, switch circuit, nonvolatile memory and program memory. Moreover, it is also possible to form a multi-chip module by forming, on the first semiconductor substrate, the CPU, internal bus, first external interface circuit, second external interface circuit, switch circuit and nonvolatile memory, forming the program memory (501) on the second semiconductor substrate, and mounting both first and second semiconductor substrates, for example, on a high density mounting substrate to form a sealed package.

[5] According to a fifth aspect of the present invention, a data processor to be applied to the data processing system based on the first aspect is considered from another aspect.

A data processor includes a first terminal connected to a first bus, a second terminal connected to a second bus, a first internal circuit and a second internal circuit, which can selectively take on a first condition or a second condition, a first signal route connected to the second terminal from the first terminal via the first internal circuit and second internal circuit, and a second signal route connected to the second terminal from the first terminal via the second internal circuit. The second internal circuit selects a desired signal route from the first signal route or second signal route depending on the condition of the first internal circuit.

The first condition is, for example, the operating condition to be executed by the first internal circuit, while the second condition is, for example, the waiting condition in which the execution of instructions is suspended. The second internal circuit selects the first route in the operating condition and also selects the second route in the waiting condition.

Moreover, a power supply control circuit is also provided to control the supply of a first power source to the first internal circuit and to supply of a second power source to the second internal circuit. In this case, the power supply control circuit stops, when the second signal route is selected for the second internal circuit, to stop supply from the first power source to the entire part or a part of the first internal circuit. In short, in the waiting condition, supply of useless operating power to the circuit which is not requested to operate is stopped.

The first internal circuit, second internal circuit and power supply control circuit may be formed on one semiconductor substrate. Moreover, it is also possible that the first internal circuit and power supply control circuit are formed on the first substrate, the second internal circuit is formed on a second semiconductor substrate, and the first and second semiconductor substrates are sealed in one package. Thereby, a data processor can be formed as a multi-chip module or the like.

When the first internal circuit includes a clock control circuit (116*a*) to supply a clock signal for synchronous operation to the first internal circuit, it is recommended that the clock control circuit stops supply of the clock signal to the first internal circuit when the second signal route is selected by the second internal circuit. In the waiting condition, it is more desirable to stop the supply of the clock signal to the circuit which is not required to operate in order to prevent useless power consumption.

As a desirable profile, the power supply control circuit for controlling supply of the first power source to the first internal circuit and for supply of the second power source to the second internal circuit stops the supply of power to the entire part or a part of the first internal circuit when the supply of the clock signal to the first internal circuit is stopped.

The first internal circuit, second internal circuit, clock control circuit and the power supply control circuit may be formed on one semiconductor substrate. Moreover, the first internal circuit, clock control circuit and power supply control circuit may be formed on the first semiconductor substrate, the second internal circuit may be formed on a second semiconductor substrate, and the first semiconductor substrate and the second semiconductor substrate may be sealed in one package to form a multi-chip module of the data processor.

[6] According to a sixth aspect of the present invention, the information processing system based on the first aspect will be considered from a different aspect.

An information processing system comprises a first bus, a second bus and a data processor connected to the first bus and the second bus. The data processor has a first operation profile and a second operation profile. In the first operation profile, the data processor processes the information supplied from the first bus and supplies the predetermined information to the second bus. In the second operation profile, the data processor directly supplies the information from the first bus to the second bus.

Moreover, according to another aspect of the present invention, a mobile phone system comprises first to third semiconductor integrated circuits, a first bus for connecting the first semiconductor integrated circuit and the second semiconductor integrated circuit, and a second bus for connecting the second semiconductor integrated circuit and the third semiconductor integrated circuit. The second semiconductor integrated circuit includes a first operation profile and a second operation profile. In the first operation profile, the second semiconductor integrated circuit performs a predetermined process based on the information supplied from the first semiconductor integrated circuit and supplies the result of process to the third semiconductor integrated circuit. In the second operation profile, the second semiconductor integrated circuit supplies the information supplied from the first semiconductor integrated circuit directly to the third semiconductor integrated circuit.

In the mobile phone system described above, the first semiconductor integrated circuit may supply a control signal which controls the second semiconductor integrated circuit to be shifted to any one of the first and second operation profiles. Such control signal may be given as a command.

In the mobile phone system, the first semiconductor integrated circuit is provided, for example, for processing of the baseband, while the second semiconductor integrated circuit is provided for display control. The predetermined processes are performed, for example, for at least the video signals.

A storage device may be connected to the second bus. For example, the storage device may store a processing program which specifies the processes to be executed in the second semiconductor integrated circuit.

DESCRIPTION OF THE PREFERRED EMBODIMENTS

Figure 1:
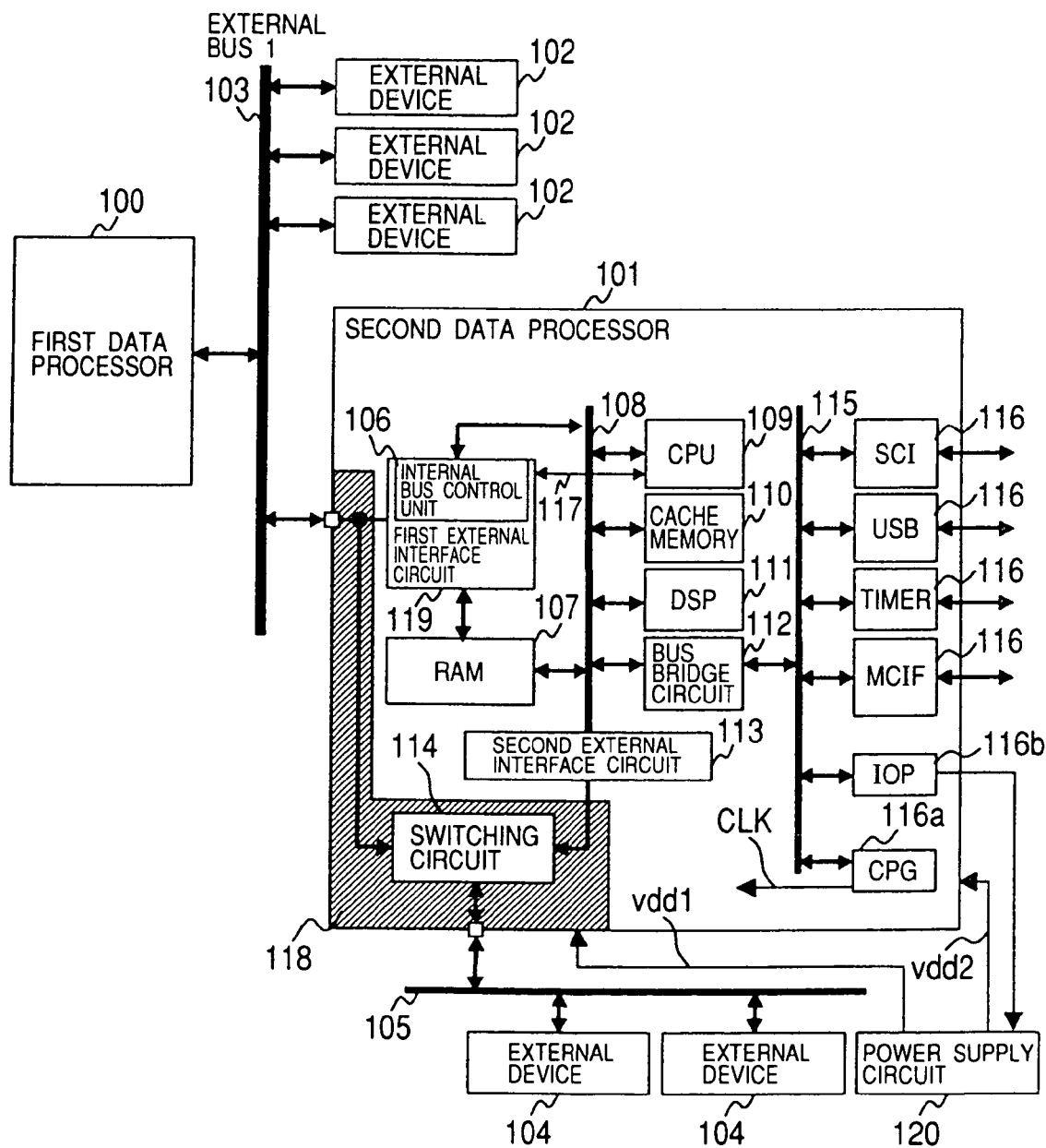
FIG. 1 is a block diagram illustrating an example of the data processing system of the present invention.

FIG. 1 illustrates an example of the data processing system of the present invention. This system is composed of a first data processor 100 that is connected to a first external bus 103 and a second data processor 101 that is connected to a second external bus 105. The first external bus 103 is connected with a plurality of external devices 102, such as a RAM, ROM and flash memory (FLASH). The second external bus 105 is connected with external devices 104, such as a RAM, ROM, FLASH, and a liquid crystal display (LCD) controller. The second data processor 101 is connected to the first external bus 103 via a first external interface circuit 119 as a device on the first external bus 103.

The second data processor 101 includes an internal high-speed bus 108 and an internal low-speed bus 115. The internal high-speed bus 108 is connected with a CPU 109, a cache memory 110, a digital signal processor (DSP) 111, a bridge circuit 112, which serves as a bus bridge circuit between the internal high-speed bus 108 and internal low-speed bus 115, the first external interface circuit 119, a second external interface circuit 113 and a RAM 107. The internal low-speed bus 115 is connected with various circuits 116, such as a serial interface circuit (SCI), a USB (Universal Serial Bus), a timer, a memory card interface circuit (MCIF), a general purpose input/output port (IOP), such as an IO port, a clock pulse generator (CPG) and a peripheral circuit, such as flash memory. In FIG. 1, the clock pulse generator (CPG) is identified by the reference numeral 116a and the general purpose Input/output port (IOP) is identified by the reference numeral 116b.

The data processing system is configured, although the invention is not particularly so restricted, as a mobile phone system. In this case, the first data processor 100 performs the baseband process. The second data processor 101 controls video display for the external device 104, such as a liquid crystal display controller, and performs signal processing, such as compression and expansion of a signal. Controls, such as the display of time, via the liquid crystal display controller are performed, although the invention is not particularly so restricted, by the first data processor 100 via the second data processor 101.

The first external interface circuit 119 allows the first data processor 100 to obtain the right for use of the internal bus of the second data processor, for example, the high-speed bus 108, and it also allows the first data processor 100, having obtained the right for use of the internal bus 108, to access an input/output circuit connected to the internal bus 108. The input/output circuit is a register or the like of the DSP 111. In short, the first data processor 100 is allowed to operate as a bus master of the internal high-speed bus 108. This operation as a bus master is controlled by the internal bus control unit 106.

Moreover, the first external interface circuit 119 controls operation of the RAM 107, which serves as a common memory or a common buffer of the CPU 109 and first data processor 100. Namely, this first external interface circuit 119 operates the RAM 107 exclusively in response to the access request to the RAM 107 from the CPU and to the access request to the RAM 107 from the first data processor 100. With the common buffer function to this RAM 107, data transfer can be realized between the first data processor 100 and the second data processor 101. For this data transfer, handshake control, for example, may be employed using an interruption signal 117. In more detail, when data is stored to the RAM 107 from the first data processor 100, the interruption signal 117 of the CPU 109 is given and the CPU 109 fetches the data of RAM 107 with the interruption process responding to such interruption. In the inverse occasion, the external interface circuit 119 issues an interruption request to the first data processor 100.

The second external interface circuit 113 has the interface specification to realize the interface operation for the external devices connected to the external bus 105. For example, when it is assumed that the FLASH and liquid crystal display (LCD) controller are connected as external devices 104, the second external interface circuit 113 performs the interface function for the flash memory interface circuit and LCD interface circuit.

In the structure of FIG. 1, a region 118 is provided with a switch circuit 114 for connecting the external bus 103, at the first external interface circuit, to the external bus 105, in place of the connecting the external bus 105 to the second external interface circuit 113, while the second data processor 101 is in the waiting condition. Namely, the switch circuit 114 selects the connection profile to connect the first external bus 103 to the second external bus 105 in place of the second external interface circuit 113, while the second data processor 101 is in the waiting condition. Accordingly, the first data processor 100 is capable of making access to a device on the second external bus 105 via the switching control unit 114. For example, the first data processor 100 is capable of controlling the liquid crystal display controller, which is present as the external device 104 on the external bus 105, via the switch circuit 114. Here, the circuit in the region 118 of FIG. 1 operates when the second data processor 101 is in the waiting condition.

In the waiting condition of the second data processor 101, supply of the clock signal to the CPU 109, DSP 111, serial interface circuit and clock synchronization circuit, such as the timer included in the relevant second data processor 101, is stopped. For example, when the CPU 109 sets a waiting condition enable bit to a waiting condition register of the clock pulse generator 116a, this clock pulse generator 116a stops the output of the clock signal CLK or stops the oscillating operation thereof so as to stop the supply of the clock signal.

In FIG. 1, the reference numeral 120 designates a power supply circuit. In the second data processor 101, the operation power vdd1 of the switch circuit 114 and the operation power vdd2 of the other circuits can be isolated from each other. For example, an external power supply terminal and a power supply wiring of the operation power vdd1 and an external power supply terminal and a power supply wiring of the operation power vdd2 may be isolated physically. The power supply circuit 120 supplies the operation power vdd1 and vdd2 to the corresponding power supply terminals. The general purpose input/output port 116b is used as a power supply control circuit for the power supply circuit 120. The general purpose input/output port 116b stops supply of the operation power vdd2 to the entire part or a part of the other circuits during the period where the second data processor 101 shifts to the waiting condition. The operation power vdd1 is always supplied to the switch circuit 114 when the second data processor 101 can operate. When the second data processor 101 goes out of the waiting condition through the interruption process, the operation power is supplied to an interruption control circuit. The power supply control circuit 116b sets the power supply control register of the power supply circuit 120 to the power source supply stop instructing condition during transition to the waiting condition. Accordingly, supply of the operation power vdd2 is stopped. Here, it is sufficient that the reset operation to the power source supply instructing condition for the power supply control register is performed during the recovery process to the operating condition from the waiting condition.

Figure 2:
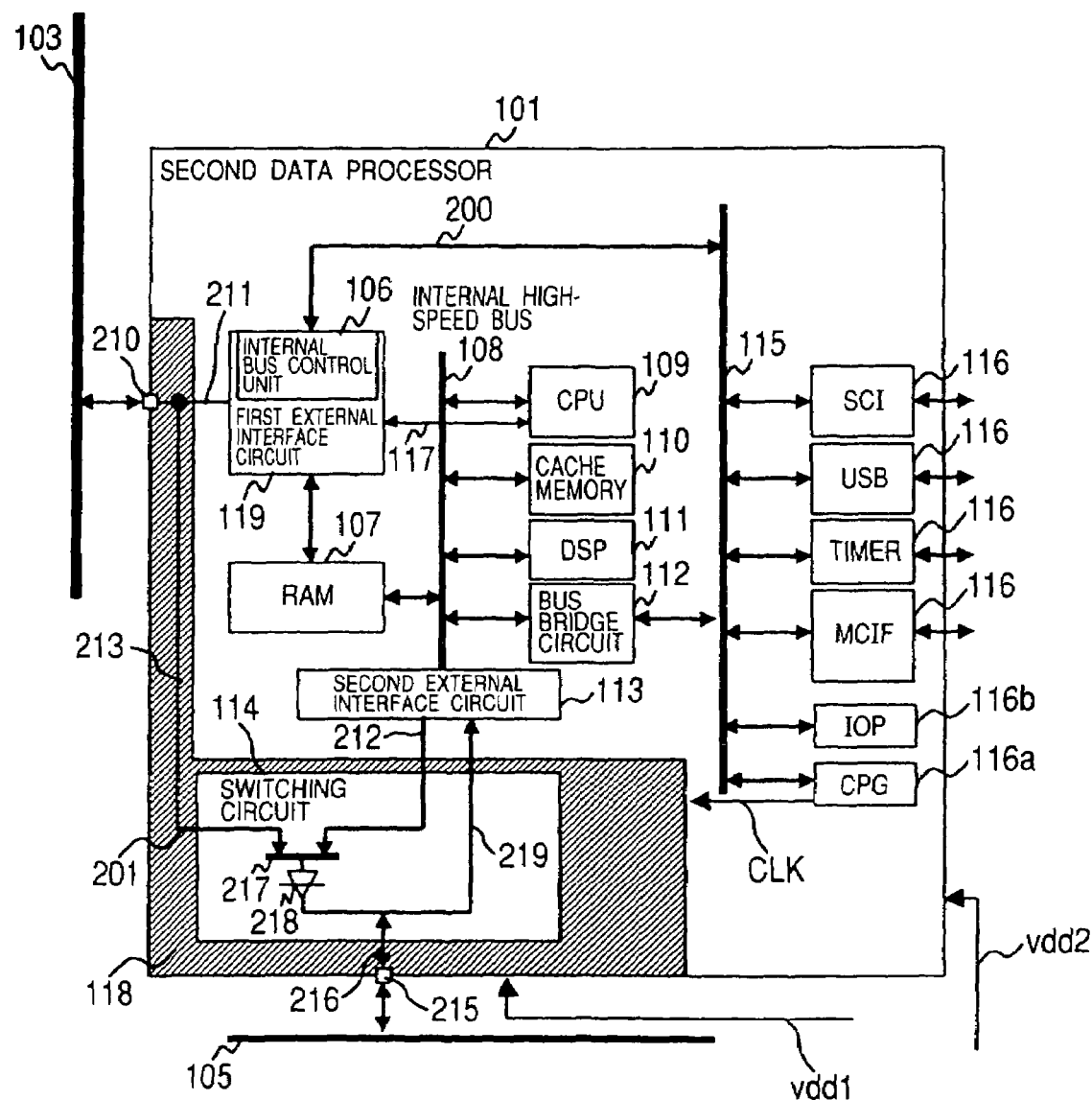
FIG. 2 is a block diagram illustrating in detail a bypass region in the second data processor of FIG. 1.

FIG. 2 illustrates an example of detailed circuits provided in the region 118 of the second data processor 101 of FIG. 1. Moreover, in this example, the first external interface circuit 119 is connected as a bus master of the internal low-speed bus 115 with a signal line 200. As illustrated by the signal line 200 of FIG. 2, the internal bus through which the first external interface circuit 119 operates as a bus master is not limited to control of the high-speed bus 108, but this technique may be applied to the low-speed bus 115 as well.

In the data processor 101, a circuit formed in the region 118 is called a second circuit, while a circuit, such as the CPU 109 that is formed in the other region, is called a first circuit. The region 118 includes a first external terminal 210, a first bus 211 for connecting the first external terminal 210 and the first circuit, a second bus 212 for connecting the first circuit and the second circuit, a third bus 213 for connecting the first external terminal and the second circuit, a second external terminal 215, a fourth bus 216 for connecting the second external terminal and the second circuit, a selector 217 for selecting any one of the second bus 212 and third bus 213 for connection to the fourth bus 216, a bus driver 218, and a fifth bus 219. The selector 217 selects the connection profile to connect the first bus 211 via the third bus 213 to the fourth bus 216 during the period of transition to the waiting condition. When attention is given to the condition of CPU 109, execution of an instruction by the first circuit is controlled (first condition) in the waiting condition, while an instruction is executed by the first circuit (second condition) in the operating condition. In the waiting condition, the second data processor 101 can connect the first external bus 103 directly to the second external bus 105. In this example, data of the first external bus 103 is transferred, without any change in condition, to the second external bus 105 in the waiting condition of the second data processor 101, but it is also possible to connect the first external bus 103 and second external bus 105 by way of an input/output buffer (not illustrated). Accordingly, input/output data to the second external bus 105 from the first external bus 103 can be controlled.

In FIG. 1 and FIG. 2, the second data processor 101 is formed as a so-called single chip data processor that is formed on one semiconductor substrate.

Figure 3:
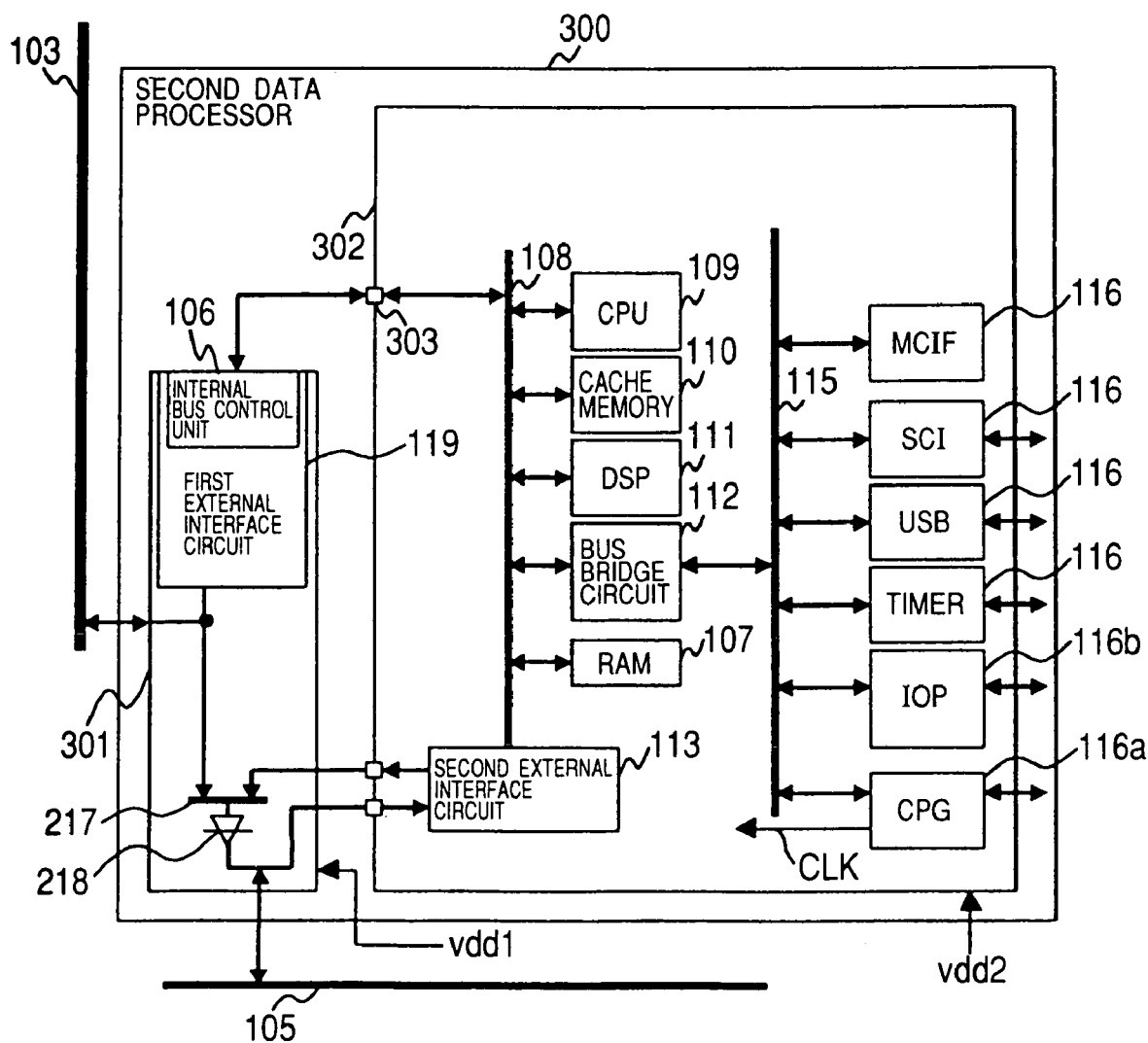
FIG. 3 is a block diagram illustrating an example in the case where a data processor is formed of a multi-chip module.

FIG. 3 illustrates an example where a second data processor 300 is configured as a multi-chip module. The second data processor 300 is composed of the first external interface circuit 119, a chip 301 having the function of the switch circuit 114 and a chip 302 having the other functions. The chip 302 has a connecting unit 303 to the internal high-speed bus 108 serving as the first external interface circuit 119, and the chip 301 connected to the connecting unit 303 can be operated as the bus master of the internal high-speed bus 108. The first external bus 103 can be connected to the second external bus 105 by operating only the chip 301 in the waiting condition of the second data processor 300.

Figure 4:
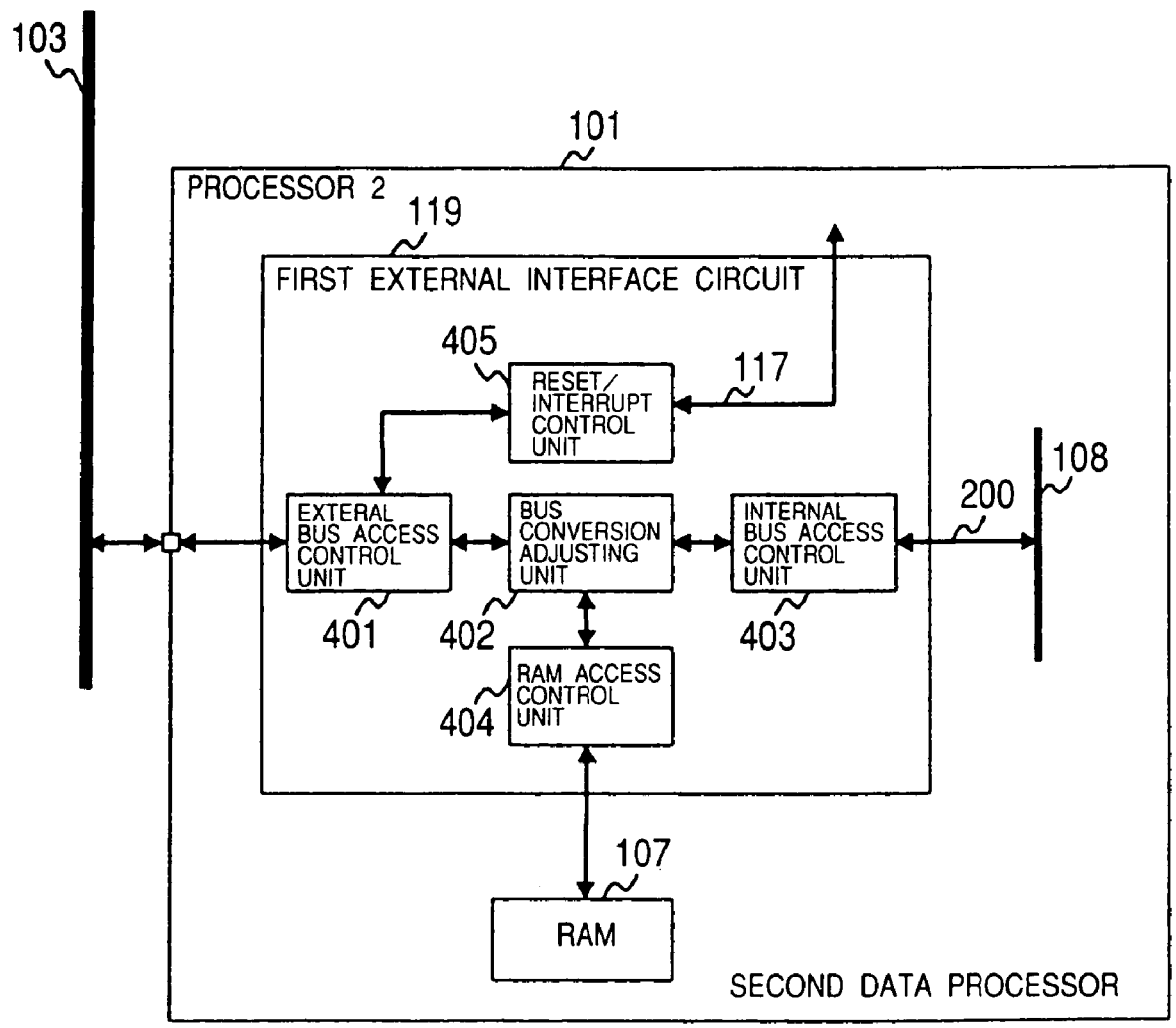
FIG. 4 is a block diagram illustrating a practical example of a first external interface circuit provided in the second data processor of FIG. 2.

FIG. 4 illustrates a practical example of the first external interface 119 of the second data processor 101. The first external interface circuit 119 is composed of an external bus access control unit 401, a bus conversion adjusting unit 402, an internal bus access control unit 403, a RAM access control unit 404 and a reset/interruption control unit 405.

The access information from the first external bus 103 is inputted to the external bus access control unit 401 and is then transferred to the bus conversion adjusting unit 402 through synchronization of the input information. The bus conversion adjusting unit judges whether the relevant access is to be made to the RAM 107 or to the internal bus 108. When this access is issued to the internal bus 108, an access request is outputted to the internal bus access control unit 403 to drive the bus access operation, depending on the bus access specification of the internal bus 108. In short, the address signal, bus access control signal and data are supplied to the bus 108, conforming to the bus access specification of the internal bus 108, and, moreover, data is received from the bus 108. When an access request is issued to the RAM 107, a memory access request is sent to the RAM access control unit 404 to drive the access operation conforming to the access specification of the RAM 107. In short, the address signal, memory control signal and data are supplied to the RAM 107 conforming to the memory access specification, and, moreover, data is received from the RAM 107.

Issuance of an interruption/reset instruction to the CPU 109 and an interruption instruction from the CPU 109 are processed in the reset/interruption control unit 405, and the external bus access control unit 401 issues the corresponding request to the device on the first external bus 103. Moreover, the request from the device on the first external bus 103 and the operation request from the RAM access control unit 404 are given, by the external bus access control unit 401, to the reset/interruption control unit 405 as a corresponding interruption request.

Figure 5:
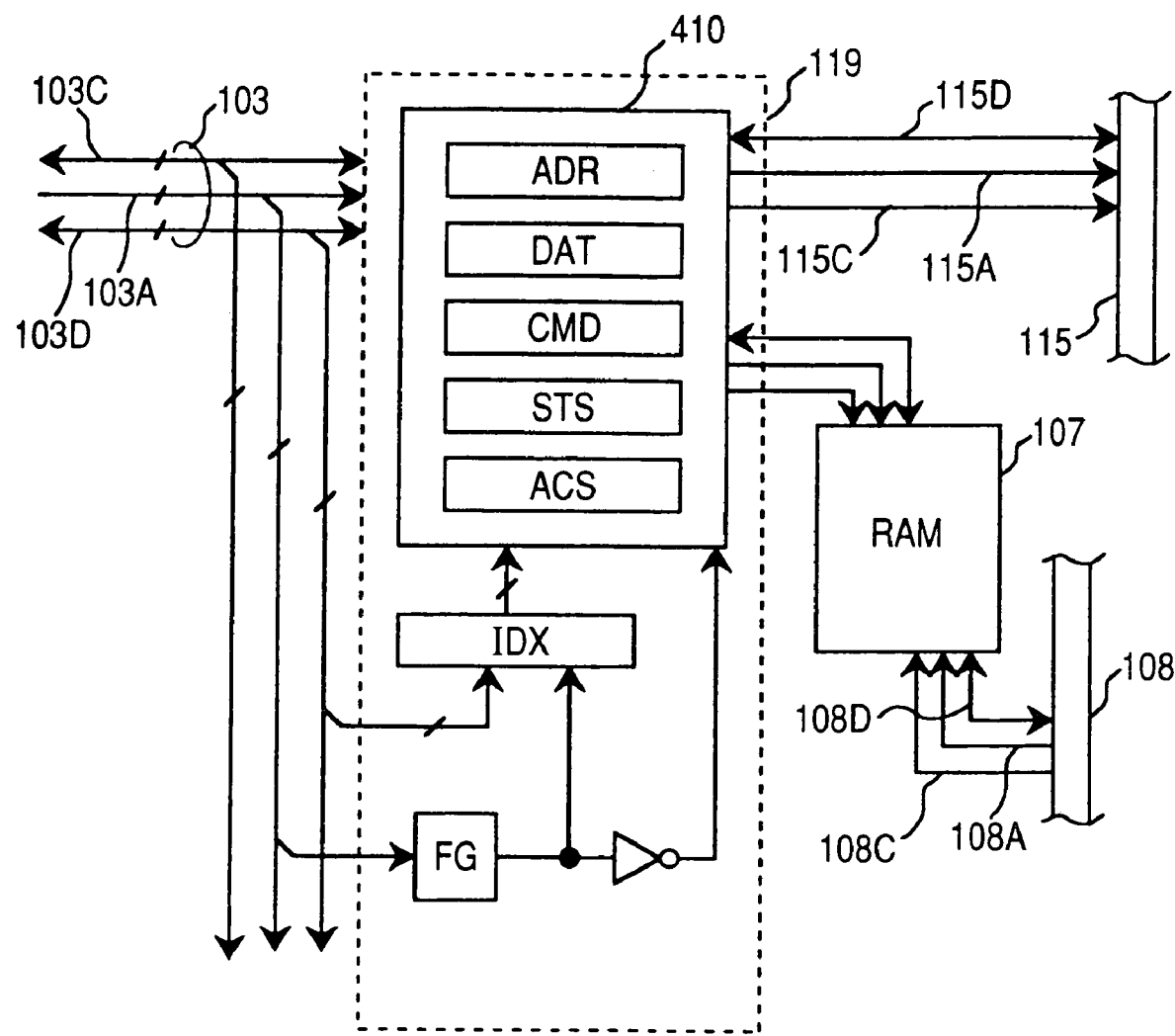
FIG. 5 is a block diagram of another practical example of the first external interface circuit provided in the second data processor.

FIG. 5 illustrates another practical example of the first external interface 119 of the second data processor 101. In this figure, a practical example to realize an interface for the bus 103, an interface for the bus 115 and an interface for the RAM 107 is illustrated. The first external interface circuit 119 includes a control circuit 410, an index register IDX and an address flag FG. The control circuit 410 includes a register comprising a built-in control circuit, such as an address register ADR, a data register DAT, a command register CMD, an access control register ACS and a status register STS. The address flag FG designates selection of the index register IDX when the logical value "1" is set, and it designates selection of the register comprising the built-in control circuit when the logical value "0" is set. Which register should be selected among the registers comprising a built-in control circuit, when the logical value "0" is set, is determined with the value of the index register IDX. The index register IDX and address flag FG are accessed via the first external bus 103. The bus 103 is composed of a data bus 103D, an address bus 103A and a control bus 103C. The register comprising a built-in control circuit is selected depending on the value of the index register IDX, and the address information, data information, bus access control information and command information are loaded to the corresponding register via the data bus 103D, and access to the RAM 107 and access to the bus 115 are driven depending on the command information that is loaded. For the access, in this case, a setting value of the register is used, and the access timing is determined on the basis of the access control information. The data written to the RAM 107 via the external bus 103 can be accessed from the CPU 109 via the internal bus 108. The bus 108 is composed of a data bus 108D, an address bus 108A and a control bus 108C. The bus 115 is composed of a data bus 115D, an address bus 115A and a control bus 115C.

Figure 6:
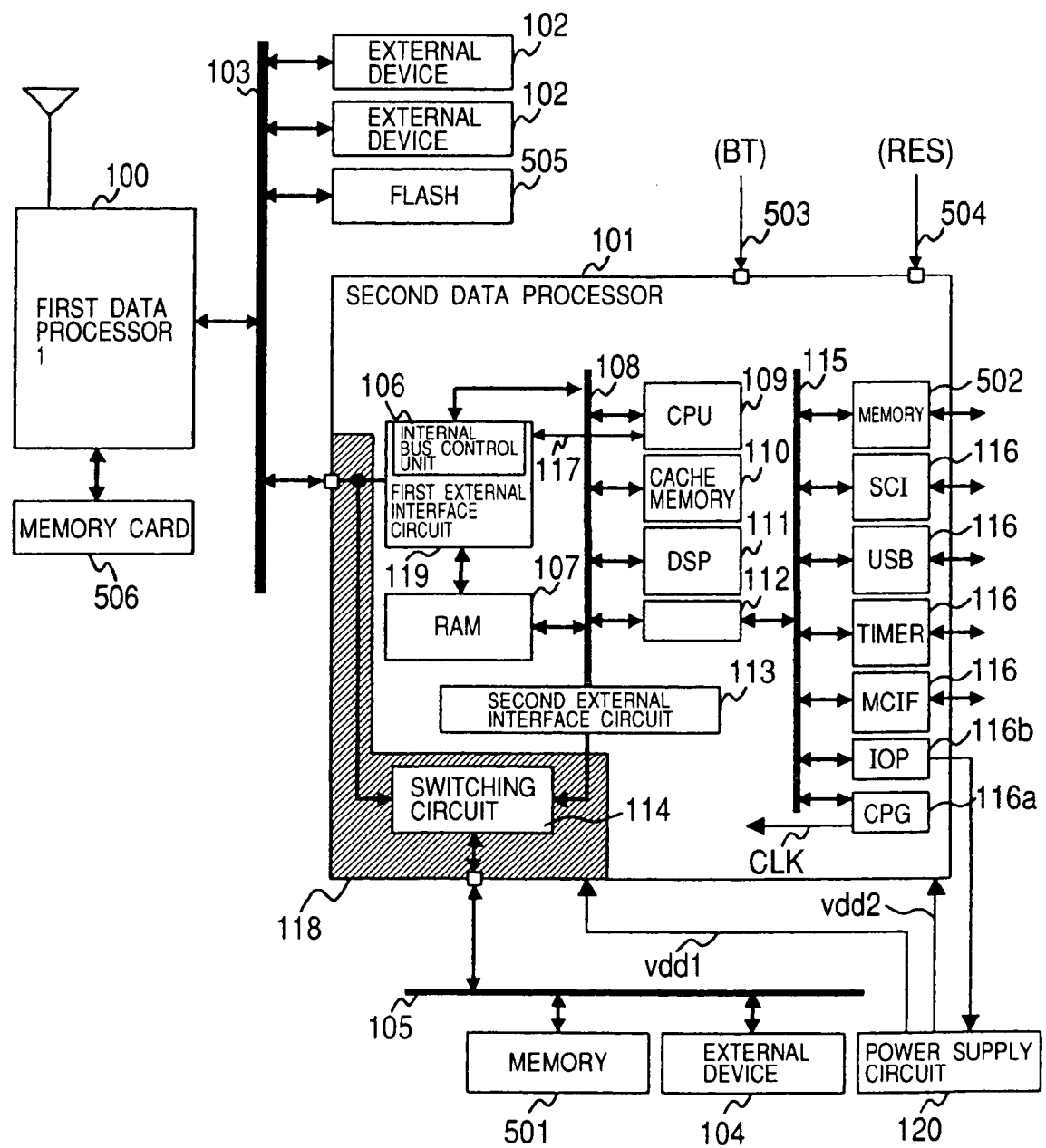
FIG. 6 is a block diagram illustrating the initial write operation of a boot program of the data processor in the data processing system of the present invention.

FIG. 6 illustrates an example of the initial writing of a boot program of the data process in the data processing system of the present invention. In the example of FIG. 6, a memory 502 is allocated in the internal bus 115 of the CPU 109, and, moreover, a memory 501 is also allocated in the second external bus 105. In this example, although the invention is not particularly so restricted, the memories 501, 502 are used as the user program storage regions. In this case, the boot program executed immediately after the second data processor 101 is reset is usually stored in the memory 501 or 502. In FIG. 6, the internal memory 502 is connected to the internal low-speed bus 115, but it may also be connected to the internal high-speed bus 108. The internal memory 502 of the second data processor is an electrically reprogrammable nonvolatile memory, such as a flash memory, and may be formed on one semiconductor substrate together with the CPU 109 or the like, or it may be formed on a different semiconductor substrate and also may be sealed in one package. When it is formed on a different semiconductor substrate and is then sealed in one package, it may be connected, within the package, to the second external bus 105 in place of connection to the internal buses 108, 115 of the second data processor 101. Here, the electrically reprogrammable nonvolatile memories 501 and 502 are used as the program memory.

The initial writing of a program to the electrically reprogrammable nonvolatile memories 501, 502 has been performed using a writing device, such as an EPROM writer, in the fabrication process of the semiconductor integrated circuit, such as data processor 101. The example of FIG. 6 is based on the assumption that a boot program is not initially written in the nonvolatile memories 501, 502 in the initial stage, where the data processor 101 is mounted on the data processing system. The data processing system of FIG. 6 enables the initial write operation of the boot program from such initial stage. In short, the system for booting the second data processor 101 from the RAM 107 is comprised within the second data processor 101. Namely, the boot program of the second data processor 101 is written to the RAM 107 from the first data processor 100 via the first external bus 103 to control the second data processor 101 to execute the program of the RAM 107 after such a write operation. For this purpose, switching is required to drive the second data processor 101 with execution of the program of the RAM 107 or with execution of the program of the memory 501 or 502. This switching operation is performed using the level of a boot mode signal (BT) 503 when a reset signal (RES) 504 instructs the reset operation. For example, when the boot mode signal 503 is in the high level during the period where the reset signal 504 is in the low level, the switching is driven by execution of the program of RAM 107; while, when the boot mode signal 503 is in the low level, the switching is driven by execution of the program of the memories 501, 502.

A structure for the initial write operation of the boot program will be described in detail. In the second data processor 101, the RAM 107 is set to the write-ready condition by the first data processor 100 in the first operation mode after the reset operation is cancelled by the reset signal 504. In the first operation mode, the boot mode signal 503 is set to the high level, for example, during the reset period where the reset signal 504 is set in the low level, and, thereby, the reset signal 504 is negated to the high level to cancel the reset operation. In this case, the CPU 109 is controlled in the instruction fetch. In short, supply of a start vector to the CPU 109 is controlled. As described above, in this case, the access to RAM 107 is extended to the first external interface circuit 106 by the first data processor 100. When the write operation to the RAM 107 by the data processor 100 is completed, the start vector for designating the leading address of the RAM 107 is supplied to the CPU 109 with the command given to the first external interface circuit 119 from the data processor 100, or in response to a change of the boot mode signal 503 to the low level from the high level. Accordingly, the CPU 109 executes the program stored in the RAM 107. Here, since attention is paid to the initial write operation of a user program, it is sufficient when the program stored in the RAM 107 is at least the write control program of the user program. The user program itself may be transferred previously to the RAM 107 together with the program described above. Otherwise, it is also possible to initially write the user program to the memory 502 by reading this program from the serial interface circuit 116 or the like through execution of the write control program transferred to the RAM 107.

In the second operation mode, after the reset operation is cancelled, the memory 501 or 502 is considered as the object of instruction fetch with the CPU 109. In the second operation mode, the boot mode signal 503 is set to the low level and the reset signal 504 is negated to the high level during the period where the reset signal 504, for example, is set to the low level, and, thereby, the reset operation is cancelled. Accordingly, the CPU 109 executes the user program initially stored in the memory 501 or 502 via the first operation mode.

The operation for storing the program for write control as the boot program to the RAM 107 from the first data processor 100 will be described.

First, prior to the booting of the second data processor 101, the boot program inputted from the external storage, such as memory 505 or memory card 506 connected to the first data processor 100, or from the serial interface (not illustrated), is written by the first data processor 100 to the RAM 107 of the second data processor 101.

The boot program transferred to the RAM 107 may include up to the application, but a short boot program may be used when it includes the following processes. For example, the programs to be written to the memory 501 or 502 are stored to the program on the RAM 107 through the transfer of programs via the first external interface circuit 119 from the first data processor 100. Otherwise, the programs to be written by transferring a program to the memories 501, 502 are stored using the serial bus, USB terminals or memory card of the peripheral device 116 of the second data processor.

From the above description, when the memories 501, 502 for boot of the second data processor 101 are flash memories, a system for initializing the flash memory has been required intrinsically in the post-process of the system assembling, but since the flash memory can be initialized in the mode for booting from the RAM 107, the mass-production cost of the data processor 101 can be reduced.

Figure 7:
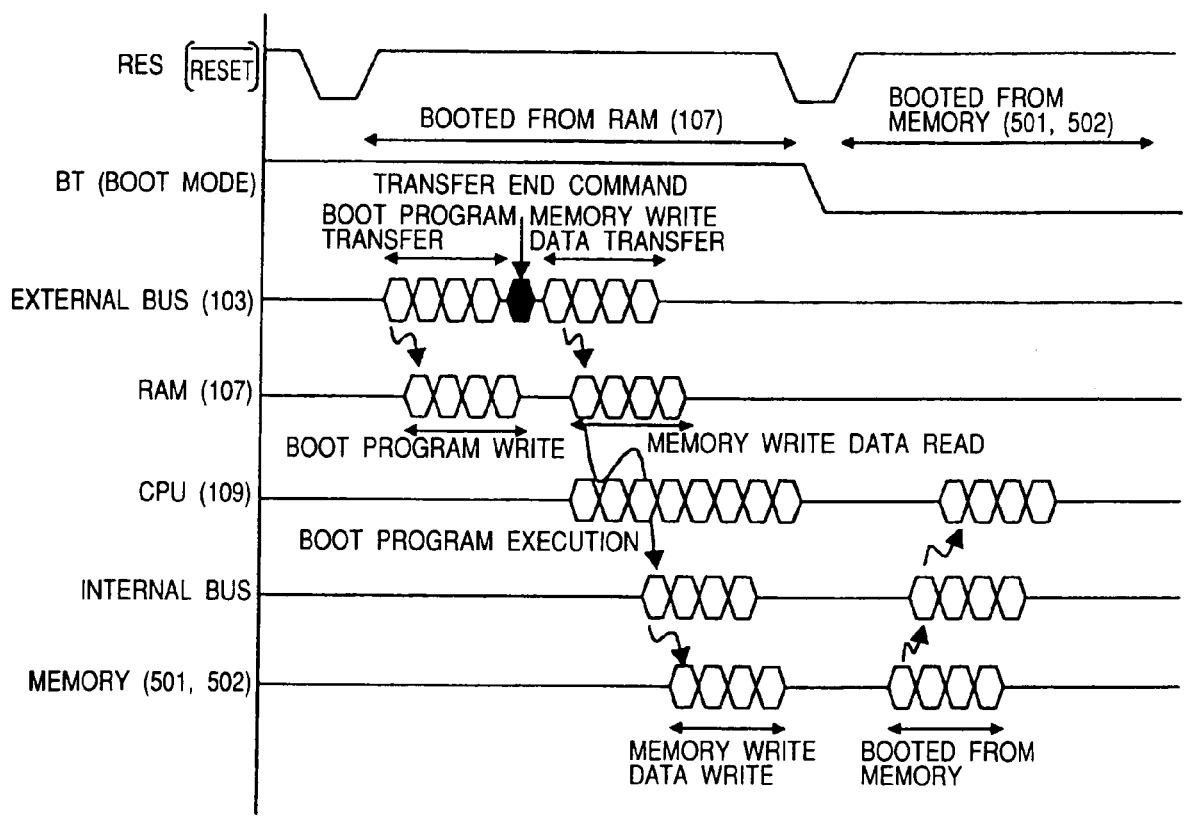
FIG. 7 is a timing diagram of the boot operation in the data processing system of FIG. 6.

FIG. 7 illustrates an example of a timing diagram of the boot operation in the data processing system of FIG. 6.

The first data processor 100 supplies a boot mode signal 503 and a reset signal 504 to control the drive of the second data processor 101.

When the first data processor sets the boot mode signal 503 to the high level to cancel the reset (the reset signal shifts to the high level from the low level) and, thereby, the second data processor is driven in the boot mode from the RAM 107, the boot program is transferred to the RAM 107 via the first external bus 103. The CPU 109 of the second data processor detects that the boot mode signal is in the high level, and the boot program is fetched from the RAM 107 via the first external interface circuit 119. The CPU 109 is controlled to perform the instruction fetch during transfer of the boot program and is, therefore, set in the waiting condition because the boot program is not supplied thereto. Upon completion of transfer of the boot program, the first data processor 100 transfers the transfer completion command to the first external interface circuit 119; and, when the first external interface circuit 119 instructs fetch of the boot program to the CPU 109, the second data processor 101 is driven with the program of RAM 107. The CPU 109 executes the boot program in the RAM 107 and performs the write process of the boot program to the memories 501, 502 via the internal high-speed bus 108. When the write process of the boot program to the memories 502, 502 is completed, the second data processor 101 is reset again (reset signal (RES) 504 is shifted to the low level from the high level) and this reset is cancelled under the condition that the boot mode signal (BT) 503 is set to the low level to drive the second data processor 101. Accordingly, the CPU 109 fetches the boot program from the memories 501, 502 to execute this program, and, thereby, the data processing operation of the second data processor is driven.

FIG. 7 illustrates an example of the operation timing to supply the boot program to the memories 501, 502 from the memory 505 or memory card 506 connected to the first data processor 100 via the first external bus 103.

Figure 8:
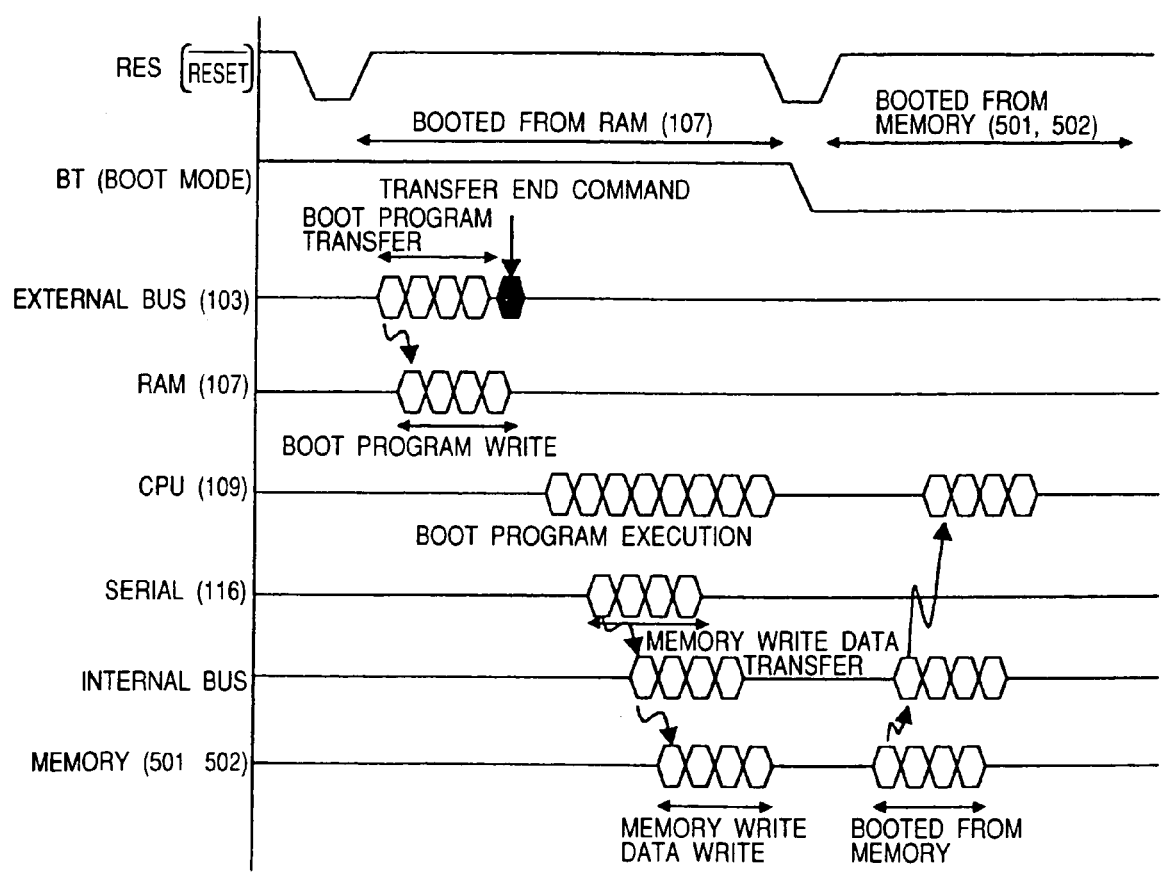
FIG. 8 is another timing diagram of the boot operation in the data processing system of FIG. 6.

FIG. 8 illustrates an example of another timing diagram of the boot operation in the data processing system of FIG. 6. The timing illustrated in FIG. 8 assumes that the boot program stored in the memories 501, 502 is supplied via the serial and USB terminals 116 or the like of the second data processor 101. The other timings are same as those of FIG. 7.

Figure 9:
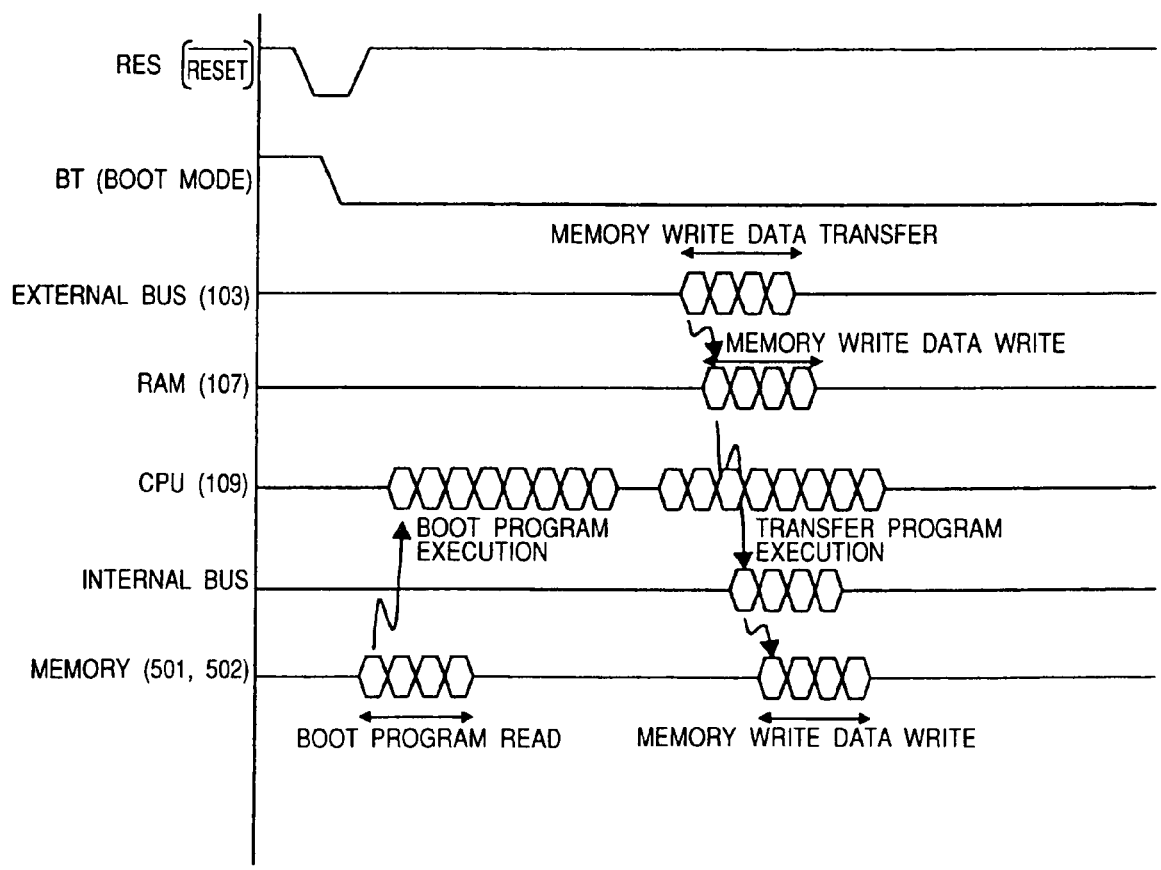
FIG. 9 is a timing diagram of the operation for updating a boot program or adding/updating applications executed by the second data processor in the condition that the boot program is stored in the program memory.

FIG. 9 illustrates an example of the timing diagram when the boot program is updated or the application executed by the second data processor 101 is added/updated under the condition that the boot program is stored in the memory 501 or 502.

When the first data processor 100 sets the boot mode signal 503 to the low level to cancel the reset, the second data processor 101 starts the drive by fetching the boot program from the memories 501, 502. The memories 501, 502 previously store the transfer program for update of the boot program or addition/update of the application executed by the processor 2, and the transfer program is driven with a drive instruction or the like from the first data processor 100. For example, the application for addition is received through radio communication via an antenna connected, for example, to the first data processor 100, and the first data processor 100 transfers the received application for addition to the RAM 107 via the external bus 103. The second data processor 101 fetches the application for addition stored in the RAM 107 to the internal bus 108 via the first external interface circuit 119 and, then, transfers this application to the memory 501 or 502 for the write operation.

Figure 10:
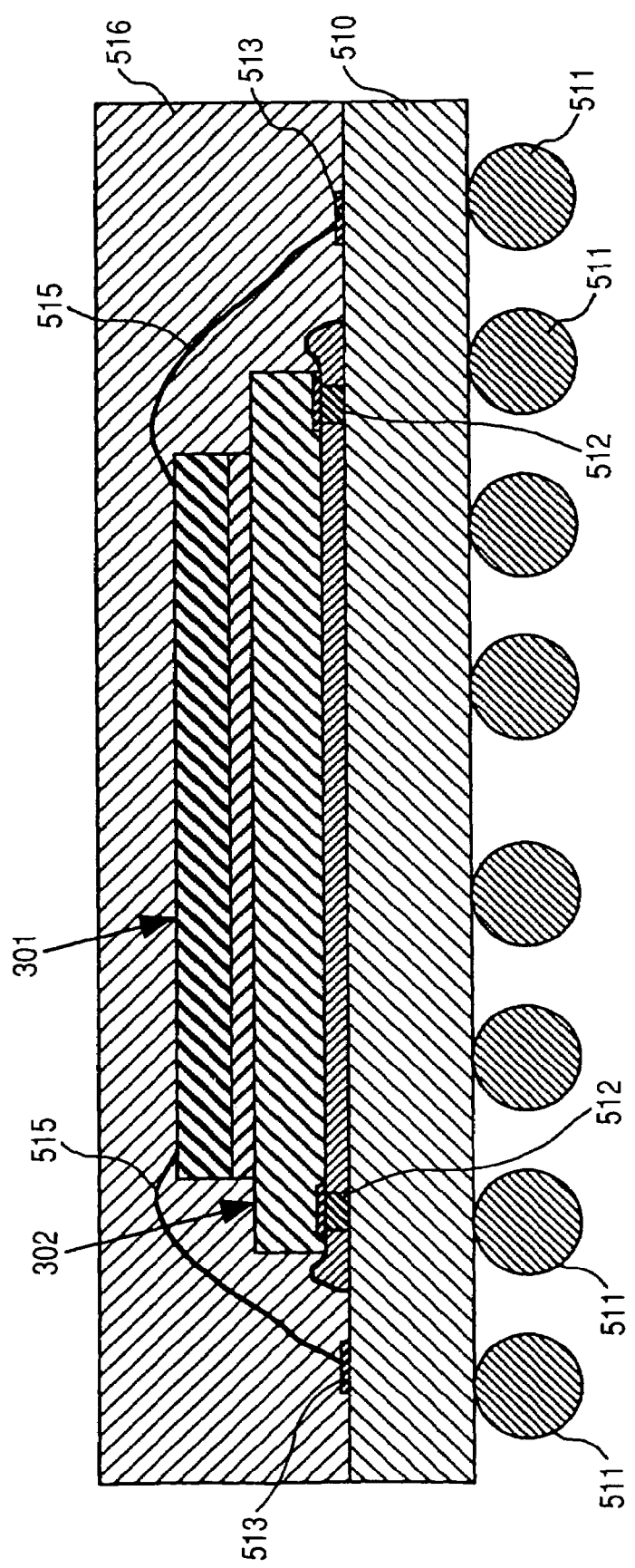
FIG. 10 is a cross-sectional view of a multi-chip module which forms the data processor of FIG. 3.

FIG. 10 illustrates an example of the cross-sectional view of a multi-chip module forming the data processor 300 of FIG. 3. On one plane of a high density mounting board 510, many bump electrodes 511, connected to the mounting surface of a printed circuit board, which is formed of a glass epoxy substrate, are allocated, while, on the other plane, many micro-bump electrodes 512 and pad electrodes 513, which are connected to the bump electrodes 511, are allocated. At a part of the micro-bump electrodes 512, a bonding pad of the semiconductor chip 302 is mounted on a face-down basis. The other semiconductor chip 301 is stacked for allocation on the semiconductor chip 302, and the bonding pad of this semiconductor chip 301 is connected to the corresponding pad electrode 513 with a bonding wire 515. The entire part of the bonding wire 515 and semiconductor chips 301, 302 is molded with resin 516.

The present invention has been described on the basis of a preferred embodiment thereof, but the present invention is not limited thereto, so that various changes and modifications are possible within the scope of the claims.

For example, the peripheral circuits and the other circuit modules comprised in the data processor are not limited to those described with reference to FIG. 1, and they may be changed as required. The internal buses of the data processor need not be provided as a high-speed bus and low-speed bus. In addition, the operation supply systems for the first circuit and second circuit are not always separated from the external power source terminals, and stopping of supply of the power may be controlled with a switch circuit. In addition, when the data processor is formed as a multi-chip module, the kind of the semiconductor integrated circuit to be loaded is not limited only to that described above, and three chips in total, such as a semiconductor chip like the flash memory 502, a processor core chip, such as the other CPU 109, and an interface chip like the semiconductor chip 301 may be mounted. A plurality of flash memory chips may also be mounted to the multi-chip module.

As described above, the present invention may be widely applied to a data processing system which is intended to effect dispersion of processing loads using a plurality of data processors, such as a mobile phone system, display control system, printer system and the other mobile information terminals, and to a data processor which utilizes such a data processing system.

What is claimed is:

1. A processor constructed on a single semiconductor substrate, which is coupled to an external processor, comprising:
   a central processing unit; and
   an interface unit;
   wherein said processor is operable to couple to a display device, wherein said processor has a plurality of operation modes including a first mode and a second mode,
   wherein, in said first mode, said processor is operable to receive first data signals from said external processor through said interface unit, and said processor is operable to provide second data signals to said display device, and
   wherein, in said second mode, said processor is operable to receive third data signals from said external processor, and is operable to directly provide the third data signals to said display device.

2. A processor according to claim 1,
   wherein said processor is operable to couple to an external memory which is operable to store a plurality of data of said processor.

3. A processor according to claim 1,
   wherein, in said second mode, a power consumption of said processor is low consumption.

4. A processor according to claim 1,
   wherein, in said second mode, said processor permits to bypass a control of said external processor to said display device.

5. A processor according to claim 1,
   wherein said processor is coupled to said external processor which is operable to perform a baseband process, and
   wherein said processor is operable to perform signal processing.

6. A processor according to claim 1,
   wherein the first data signals and the second data signals have a relationship with each other.

7. A processor according to claim 1,
   wherein the first data signals and the second data signals are not related to each other.

8. A processor constructed on a single semiconductor substrate, which is operably coupled to a baseband processor, comprising:
   a central processing unit; and
   an internal module,
   wherein said processor is operable to receive first data signals from said baseband processor,
   wherein said processor is operably coupled to a display device, and
   wherein said processor is operable to directly provide the first data signals from said baseband processor to said display device, bypassing a portion of said processor.

9. A processor according to claim 8,
   wherein said processor is operable to provide an interrupt signal to said baseband processor.

10. A processor constructed on a single semiconductor substrate, which is coupled to an external processor, comprising:
    a central processing unit; and
    an interface unit;
    wherein said processor is operable to couple to a display device,
    wherein said processor has a plurality of operation modes including a first mode and a second mode,
    wherein, in said first mode, said processor is operable to receive first data signals from said external processor through said interface unit, and said processor is operable to provide second data signals to said display device, and
    wherein, in said second mode, said processor is operable to receive third data signals from said external processor and provide the third data signals to said display device.

11. A processor according to claim 10,
    wherein said processor is operable to couple to an external memory which is operable to store a plurality of data of said processor.

12. A processor according to claim 10,
    wherein, in said second mode, a power consumption of said processor is low consumption.

13. A processor according to claim 10,
    wherein, in said second mode, said processor permits to bypass a control of said external processor to said display device.

14. A processor according to claim 10,
    wherein said processor is coupled to said external processor which is operable to perform a baseband process, and
    wherein said processor is operable to perform signal processing.

15. A data processor formed on one semiconductor substrate comprising:
    an internal bus;
    a CPU coupled to the internal bus;

a first interface coupled to the internal bus and capable of coupling to an external data processor; and a second interface coupled to the internal bus and capable of coupling to an external device;

wherein the data processor has first and second conditions, wherein the execution of an instruction by the CPU is stopped in the first condition, and the CPU executes an instruction in the second condition, wherein, the data processor provides first data to the external device via the second interface in the second condition, and wherein, in the first condition, the data processor receives second data from the external processor not via the first interface and the second data is provided to the external device not via the second interface, so that the first data processor is capable of making access to the external device.

16. A data processor formed on one semiconductor substrate comprising:

an internal bus;

a CPU coupled to the internal bus;

a first interface coupled to the internal bus and capable of coupling to an external processor; and a second interface coupled to the internal bus and capable of coupling to a first external device, wherein the data processor has first and second conditions, wherein, in the second condition, the second interface provides first data to the external device, and wherein, in the first condition, second data received from the external processor is capable of bypassing the first interface and the second interface, and is capable of being provided to the first external device.

17. A data processing system comprising:

a first data processor;

a second data processor coupled to the first data processor, comprising:

an internal bus;

a CPU coupled to the internal bus;

a first interface coupled to the internal bus and the first data processor; and a second interface coupled to the internal bus and capable of coupling to an external device;

wherein the second data processor has first and second conditions, wherein the execution of an instruction by the CPU is stopped in the first condition, and the CPU executes an instruction in the second condition, wherein, the second data processor is capable of providing first data to the external device via the second interface in the second condition, and wherein, in the first condition, the first data processor is capable of providing second data to the external device not via the second interface.

* * * * *